(12) United States Patent
Burlage et al.

(10) Patent No.: US 7,779,852 B2
(45) Date of Patent: Aug. 24, 2010

(54) WATER CONSERVATION SAFETY SHUT-OFF VALVE

(75) Inventors: Roger A. Burlage, Westlake Village, CA (US); Brian J. Burlage, Marshalltown, IA (US)

(73) Assignee: Castlebridge Enterprises, Inc., West Lake Village, CA (US)

( * ) Notice: Subject to any disclaimer, the term of this patent is extended or adjusted under 35 U.S.C. 154(b) by 298 days.

(21) Appl. No.: 11/871,300

(22) Filed: Oct. 12, 2007

(65) Prior Publication Data

US 2008/0087330 A1 Apr. 17, 2008

Related U.S. Application Data

(63) Continuation-in-part of application No. 11/548,862, filed on Oct. 12, 2006, now Pat. No. 7,392,817.

(51) Int. Cl.
*F16K 31/02* (2006.01)
*E03D 11/02* (2006.01)

(52) U.S. Cl. .................. 137/1; 137/624.11; 137/460; 251/68

(58) Field of Classification Search .................. 137/1, 137/624.11, 460, 456; 251/68
See application file for complete search history.

(56) References Cited

U.S. PATENT DOCUMENTS

| | | | |
|---|---|---|---|
| 4,352,025 A | 9/1982 | Troyen | |
| 4,708,264 A | 11/1987 | Bruninga | |
| 4,807,661 A * | 2/1989 | Lewis et al. | 137/456 |
| 4,936,508 A | 6/1990 | Ingalz | |
| 5,002,090 A * | 3/1991 | Ichikawa et al. | 137/550 |
| 5,540,107 A | 7/1996 | Silverman et al. | |
| 5,782,263 A | 7/1998 | Isaacson, Jr. et al. | |
| 5,971,011 A | 10/1999 | Price | |
| 6,061,843 A | 5/2000 | Rump et al. | |
| 6,708,722 B1 | 3/2004 | Goodenough | |

(Continued)

FOREIGN PATENT DOCUMENTS

GB 2 236 576 A1 4/1991

(Continued)

OTHER PUBLICATIONS

Hydroelectric Generator: Micro-hydro Basics, A Renewable Energy Project Kit, The Pembina Institute, pp. 1-9, re-energy.ca.

*Primary Examiner*—Kevin L Lee
(74) *Attorney, Agent, or Firm*—McKee, Voorhees & Sease, P.L.C.

(57) ABSTRACT

The present invention is a water conservation safety shut-off valve assembly for use on locations which normally have intermittent water usage but need to indicate when there is constant water usage, such as a leak. The valve assembly has a valve body with a fluid pathway and a valve plug held in an open position allowing water to flow through the pathway. As water flows through the pathway, a flow detection switch monitors water flowing through the pathway and begins timing duration of water flowing through the pathway. If the water flow through the pathway stops, the timer value is reset to zero. If the water flows through the pathway, and the timer circuit reaches a predetermined value, the valve closes the pathway, stopping the flow of water through the valve assembly.

21 Claims, 11 Drawing Sheets

U.S. PATENT DOCUMENTS

| | | | |
|---|---|---|---|
| 6,837,271 B1 * | 1/2005 | Saint | 137/624.12 |
| 6,877,170 B1 | 4/2005 | Quintana et al. | |
| 6,885,114 B2 | 4/2005 | Baarman et al. | |
| 7,075,768 B2 | 7/2006 | Kaneko | |
| 2004/0126223 A1 | 7/2004 | Maloney | |

FOREIGN PATENT DOCUMENTS

| | | |
|---|---|---|
| GB | 2 377 311 A | 1/2003 |

* cited by examiner

WATER CONSERVATION SAFETY SHUT-OFF VALVE

CROSS-REFERENCE TO RELATED APPLICATIONS

This application is a Continuation-in-Part of U.S. Ser. No. 11/548,862 filed Oct. 12, 2006, now U.S. Pat. No. 7,392,817 herein incorporated by reference in its entirety.

BACKGROUND OF THE INVENTION

The present invention relates to a water conservation safety shut-off valve.

Water usage and conservation is widely studied and many articles are written about ways for consumers and industry to conserve water. The proposed solutions generally fall into two categories: (1) behavioral and (2) engineered. Behavioral solutions are generally human responses to situations to conserve water, such as turning off the water faucet while brushing teeth. Most of the engineered solutions presented are plumbing solutions aimed at restricting consumption of water; these include items like "low-flush toilets, "toilet displacement devices," "low-flow showerheads," and "faucets aerators." Yet, the question still remains as to what is the most important thing an individual can do to reduce water usage in the home.

A simple answer is to identify and repair leaks in appliances and other plumbing fixtures. For example, the toilet tank is probably the most neglected plumbing fixture in a home. As valves and refill ball cocks age, they tend to leak. Flappers will deteriorate over time with exposure to water. Eventually, they begin a slow but constant seepage. Often, they silently leak away thousands of gallons of potable water before they are detected. Similarly, ball cocks will weaken with age and fail to shut-off after the tank is full, resulting in water slowly pouring over the top of the tanks overflow tube. Periodically, valves and ball cocks should be replaced as part of the routine maintenance of all plumbing in the home. A 1984 study by the U.S. Department of Housing and Urban Development reported that 20% of all toilets leak. Most leaks occur when water leaks from the tank into the bowl through flapper valves, valve seats, and overflow tubes, which often go unnoticed and unheard.

Despite attempts to conserve water, the undetected leaks account for inadvertent loss of water resources and can account for thousands of gallons of water lost in as much as 20% of all homes. All engineered solutions, sooner or later, succumb to behavioral solutions that require human intervention with inspection and repair. Thus, no engineered solutions exist to intervene when excessive water usage is detected.

Thus, in view of the foregoing, the primary feature or advantage of the present invention is to provide a water conservation safety shut-off valve which addresses one or more of the foregoing problems.

Another feature or advantage of the present invention is a water conservation safety shut-off valve which can be easily attached to existing appliances, such as toilets.

Another feature or advantage of the present invention is a water conservation safety shut-off valve which resets itself under normal use, but times out and closes under abnormal extended use.

Another feature or advantage of the present invention is a water conservation safety shut-off valve which indicates to a user when there is a problem with water usage through the valve.

Another feature or advantage of the present invention is a water conservation safety shut-off valve which is easily resettable by a user.

Another feature or advantage of the present invention is a water conservation safety shut-off valve which is economical to manufacture, durable in use, and efficient in operation.

Another feature or advantage of the present invention is a water conservation safety shut-off valve which is adapted to detect minimal flows from a slow leak.

Another feature of advantage of the present invention is a water conservation safety shut-off valve which requires little voltage to operate and no voltage during nonfluid flow events.

Another feature or advantage of the present invention is a water conservation safety shut-off valve which exhibits minimal pressure drop across the valve.

Another feature or advantage of the present invention is a water conservation safety shut-off valve resistant to impurity and particulate buildup.

Another feature or advantage of the present invention is a water conservation safety shut-off valve having a time adjust feature void of multivariable time inputs and/or flow inputs, sophisticated microprocessor algorithms and complicated user interface traditionally needed for setup and operation.

Another feature or advantage of the present invention is a method of reducing water loss through leaky appliances using a water conservation safety shut-off valve.

One or more of these and/or other features or advantages will become apparent to one of ordinary skill in the art as described in the specification and claims that follow.

BRIEF DESCRIPTION OF THE INVENTION

One or more of the foregoing features or advantages may be accomplished by a fluid shut-off valve assembly and method where the fluid shut-off valve has a valve body having a fluid passageway, a valve plug adapted to close-off the fluid passageway, a flow detection switch having a flow sensor adapted to detect fluid flow through the fluid passageway, a timer electrically connected to the flow detection switch wherein the timer is activated by the flow detection switch and adapted to time duration of fluid flowing through the fluid passageway, and the timer being further adapted to time out to cause the valve plug to close-off the fluid passageway to prevent fluid waste. In a preferred form, the flow sensor has a piston displaced by fluid flow through the fluid passageway and a reed switch adapted to be magnetically actuated by the piston wherein the reed switch is adapted to communicate electrically with the timer to notify the timer of a fluid flow event. The piston within the flow sensor may be reset to a neutral position in a nonfluid flow event. The flow sensor also has a variable actuation set point wherein the flow sensor notifies the timer of a fluid flow event exceeding the actuation set point.

One or more of the foregoing features or advantages additionally may be accomplished by a method of conserving fluids. The method includes providing a shut-off valve wherein the valve includes a valve body having a fluid flow path, a valve plug, a flow detection switch having a flow sensor, and a timer electrically connected to the flow detection switch, moving the valve plug out of the fluid flow path, sensing fluid flow through the fluid flow path using the flow sensor, activating the timer by sending a signal from the flow detection switch to the timer during the fluid flow event, and releasing the valve plug into the fluid flow path to obstruct fluid flow through the shut-off valve to prevent fluid waste upon the timer timing out. In a preferred form, the method also includes the steps of displacing a piston in the flow detection switch, actuating magnetically a reed switch by displacing the piston to notify electronically the timer of the fluid flow event, sensing a nonfluid flow event with the piston for moving the reed switch to a deactivated position, setting an actuation set point for notifying the timer of the fluid flow event exceeding the actuation set point of the flow detection switch, generating electricity with fluids passing through the shut-off valve for powering electronics within the shut-off valve, and resetting the timer with the flow detection switch upon sensing a nonfluid flow event.

DETAILED DESCRIPTION OF THE PREFERRED EMBODIMENT

The present invention is a water conservation safety shut-off valve and method.

Figure 1:
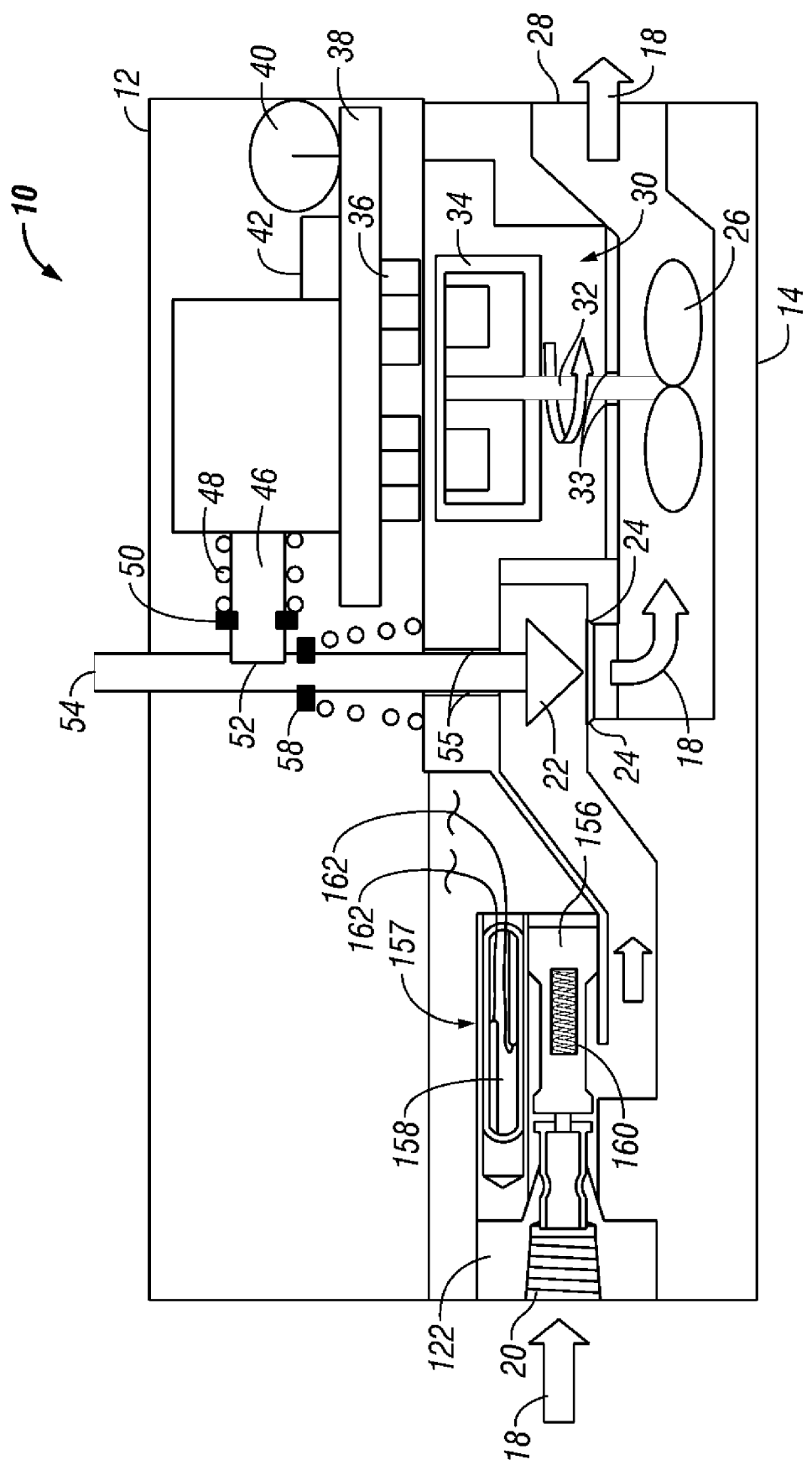
FIG. 1 is a cutaway side view of one embodiment of the water conservation safety shut-off valve of the present invention.

FIG. 1 shows a water conservation safety shut-off valve assembly 10 of the present invention. The valve assembly 10 has a cover 12 for containing and protecting parts of the valve assembly 10 used in connection with the valve body 14.

The valve body 14 can be constructed from any material capable of allowing water or other fluids to flow through the valve body 14. However, it is preferred that the valve body 14 be constructed from plastic, brass, or other substances which have low risk of rust, corrosion, etc.

There is a water flow path 18 through the valve body 14 as indicated by the arrows showing the water flow path 18. The water flow path 18 can be any shape or direction through the valve body 14 and can be any size depending on the need or volume of water which is to flow through the valve assembly 10. Water enters the valve assembly 10 at the water inlet connection 20 of the water flow path 18, flows past a valve plug 22, and through a valve seat 24, through a flow detection switch 122 past an electrical current generating device, such as an impeller or blade 26, and out the water outlet connection 28 of the water flow path 18.

The water inlet connection 20 and the water outlet connection 28 can be adapted to connect with any desirable plumbing fixture or use. For example, the inlet 20 and outlet 28 can be adapted to connect to a standard household plumbing supply line so that the valve assembly 10 can be used with toilets, faucets, ice makers, etc. Additionally, the inlet 20 and outlet 28 can be adapted to be used with other plumbing devices, such as garden hoses, so that the valve assembly 10 can be used to automatically monitor usage of water and close the valve assembly 10, stopping the flow of water through the flow path 18 when attached to a lawn sprinkler. In other words, the valve assembly 10 can be adapted to connect with or fit to any desirable use or appliance.

In an exemplary embodiment of the present invention where the valve assembly 10 generates power to be self or partially self sustaining, the body head assembly 30 holds the impeller shaft 32. The impeller shaft 32 is attached to the impeller or blade 26. The impeller or blade 26 can be any shape or configuration, such as an impeller, blade, squirrel cage, etc, but will be called impeller for simplicity. As water flows through the water path 18, the pressure and flow of the water rotates the impeller 26. Seals 33 surround the impeller shaft 32 keeping the water inside the water flow path 18 and allowing the impeller shaft 32 to rotate outside of the water flow path 18 and within the body head assembly 30. The direction of rotation of the impeller 26 and the impeller shaft 32 is not critical.

An onboard microgenerator system generates electricity using the power of the water flowing through the flow path 18 to turn the impeller shaft 32. As the impeller shaft 32 turns, it turns a rotor portion 34 of the generator. The rotor 34 is separate from, but in close enough proximity with a stator portion of the generator 36 to create an inductive electromagnetic force to generate electricity as easily understood by one ordinarily skilled in the art. The generator in the preferred embodiment uses permanent magnets to form the rotor portion 34 and uses electrically conductive wire coils to complete the stator portion 36 of the generator. With the rotation of the permanent magnets of differing magnetic poles, an electrical current is induced in the stator coils 36, thereby generating electricity.

The stator 36 is attached to a printed wiring assembly or printed circuit board 38. The printed circuit board 38 is located separate from the valve body 14 to avoid any contact with water or fluid flowing through the valve and is preferably located inside the cover 12 to protect from dust and electrical shock.

Electricity generated by the generating system 34, 36 is regulated by circuitry on the printed circuit board 38 and stored in an electricity storage capacitor or battery 40. Any type of energy storage device can be used for storing the electricity generated by the generating system 34, 36.

Since the water flowing through the flow path 18 may be intermittent such as the normal use of a household toilet, the generating system 34, 36 generates electricity as water flows through the flow path 18 turning the impeller 26 and the rotor 34, thereby generating electricity and storing the generated electricity in the storage capacitor or battery 40 for use in running the circuitry on the printed circuit board 38. As a result, the printed circuit board 38 has a continuous supply of energy to operate the onboard circuitry, even though the generation of electricity is intermittent.

A timing circuit 42 may be incorporated onto the printed circuit board 38. The timing circuit 42 may monitor the position of flow detection switch 122 meaning that water or fluid is flowing or not flowing through the flow path 18 at a rate sufficient to trip flow detection switch 122 or generate electricity. One reason for the timing circuit is to determine the duration or length of time water or fluid has been traveling through the flow path 18. Used in this way, the time or duration calculated by the timing circuit 42 can determine if water or fluid has been traveling through the flow path 18 greater than a predetermined duration of time which would indicate abnormal operation and possibly a leak in downstream appliances. On the other hand, if the valve assembly 10 is used on a yard sprinkler or the like, a time out of the timer 42 simply indicates the desired duration of use has elapsed.

Once the timing circuit 42 determines that the duration or time of water flowing through the flow path 18 is greater than the predetermined value, the timing circuit 42 initiates a transfer of electrical energy from the storage capacitor or battery 40 to an electrical solenoid 44. The solenoid 44 is a standard solenoid having a plunger 46 which travels linearly back and forth along the solenoid 44. A solenoid plunger spring 48 is held in place around the solenoid plunger 46 between a casing for the solenoid 44 and the solenoid plunger spring keeper ring 50. The solenoid plunger spring 48 keeps biasing pressure on the solenoid plunger 46 to maintain an outer-most traveled position when the solenoid 44 is not electrically energized. Once the solenoid 44 is energized electrically, the magnetism created within the solenoid 44 pulls the solenoid plunger 46 toward the solenoid 44 body against the biasing pressure of the solenoid plunger spring 48. Then, once the electrical energy is no longer energizing the solenoid 44 coils, the solenoid plunger 46 then travels back outward with the biasing force of the solenoid plunger spring 48.

The solenoid plunger 46 engages a detent or catch 52 in the valve stem 54 of the valve plug 22. Having the solenoid plunger 46 engage the detent 52 on the valve stem 54 causes the valve stem 54 and corresponding valve plug 22 to be held into position until the solenoid 44 is energized, pulling the solenoid plunger 46 away from the valve stem 54 and out of the valve stem detent 52.

The valve stem 54 and valve plug 22 travel linearly through the valve body 14, the body head assembly 30, and cover 12. Having the valve stem 54 extend through the cover 12 allows for the valve stem 54 to indicate whether the valve plug is in an open or closed position with respect to the valve seat 24 and a flow path 18. If the valve stem 54 is lower with respect to a cover 12, the valve plug is mating with the valve seat 24 and thereby closing off the flow path 18. A user can then simply pull upward on the valve stem or trip indicator 54 until the valve plug 22 disengages the valve seat 24 and the detent 52 mates with the solenoid plunger 46 again holding the valve stem 54 and valve plug 22 in an open position allowing water or fluid to again flow through the flow path 18. In addition to the valve stem or trip indicator 54 indicating open or closed position of the valve plug 22, a signal can be generated by the electronics on the circuit board 38 to operate a light, buzzer, or other type of trip indicator (not shown).

To keep the water flowing through the flow path 18, a seal or seals 55 are located in the body head assembly 30, allowing the valve stem 54 to travel linearly, but not allowing water to leak through the seal 55. The valve stem 54 is biased towards a downward position, or towards the valve seat 24 by the valve stem spring 56 and the valve stem spring keeper ring 58. In this configuration, shown in FIG. 1, the valve stem spring 56 is a tension spring held between the body head assembly 30 and the valve stem spring keeper ring 58 and pulling downward on the valve stem 54. Therefore, in the relaxed position, the valve stem 54 is in its downward most position so that the valve plug 22 can sealably mate with the valve seat 24 to close the flow path 18.

As shown in FIG. 1, the valve stem spring 56 is a tension spring pulling downward, whereas the solenoid plunger spring 48 is a compression spring pushing outward on the solenoid plunger 46. However, any type of spring or biasing device can be used with the solenoid plunger 46 or the valve stem 54 so long as the solenoid plunger 46 can securably engage the valve stem 54 holding it in position and the valve stem can travel when released by the solenoid plunger 46 to close the flow path 18.

FIG. 1 also discloses a flow detection switch 122 adapted to monitor water passing through the flow path 18. The flow detection switch 122 may have adjustable set-points and may be of the type that is commercially available. In one exemplary flow detection switch 122, a calibrated piston 156 is displaced by water flow to magnetically actuate a sealed hermetic reed switch 158. When flow decreases, a positive spring 160 returns the piston 156 to its prior position and de-actuates the reed switch 158. The reed switch assembly 157 is movable to allow for setting the flow rate within the limits of the switch 158. For example, the flow detection switch 122 may be set to detect flow streams greater than 1 drip per second, meaning the reed switch 158 will detect the position of the magnet within the piston for flows in excess of 1 drip per second. In larger flow stream scenarios, water passing through the flow detection switch 122 displaces the piston 156 allowing maximum flow and minimal pressure drop across the valve assembly 10. The flow detection switch 122 may be electronically configured into the valve assembly 10 by attaching lead wires associated with the flow detection switch 122 to the solenoid 44, timing circuit 42, and/or circuit board 38. For example, in one embodiment of the present invention, the piston 156 moves to and remains in a nonobstructive flow position when flow demand is increased. When the piston 156 is moved back to a nonobstructive flow position, the flow detection switch 122 activates timing circuit 42 and/or sends a signal to the circuit board 38. The timing circuit then operates as previously explained. At a fixed minimum flow, the piston 156 within the flow detection switch 122 moves back to its earlier position, thereby causing a change in the flow detection switch 122 and the signal sent to timing circuit 42 and/or circuit board 38. Similarly, the flow detection switch 122 could be set to detect leaks or drips. For example, the flow detection switch 122 may be configured to detect minimal flows, which may be difficult to detect by wave or turbine type flow meters or detection devices. The ability to detect even the most minimal flows is critical to preventing large wastes of water that amount over time. The flow detection switch 122 requires little or no power during flow and nonflow events, respectively. For example, in a nonflow event, the flow detection device 122 requires no voltage to operate. Conversely, in flow events, the flow detection device 122 requires minimal voltage to operate. Minimal or zero power requirements lengthens the life of any depletable energy storage device, such as a battery, capacitor, and/or rechargeable power cell.

The flow detection device 122 is resistant to many of the problems associated with other flow detection devices. For example, as water is a carrier of chemicals, minerals, particulates, and other impurities which can cause buildup and eventual obstruction of movement, inaccuracies and/or ultimately failure in turbine, wave, like type flow switches. Moreover, the flow detection switch 122 integrated into the valve assembly 10 provides a simple, cost-effective, reliable, accurate, and technically simplified manner of detecting fluid flow. The flow detection switch 122 also allows one time adjustment of the timing circuit 42 thereby preventing multivariable inputs of time and flow events. Similarly, sophisticated microprocessor algorithms and complicated user interfaces to setup and operate the valve assembly 10 are not necessary with the present invention.

Figure 2:
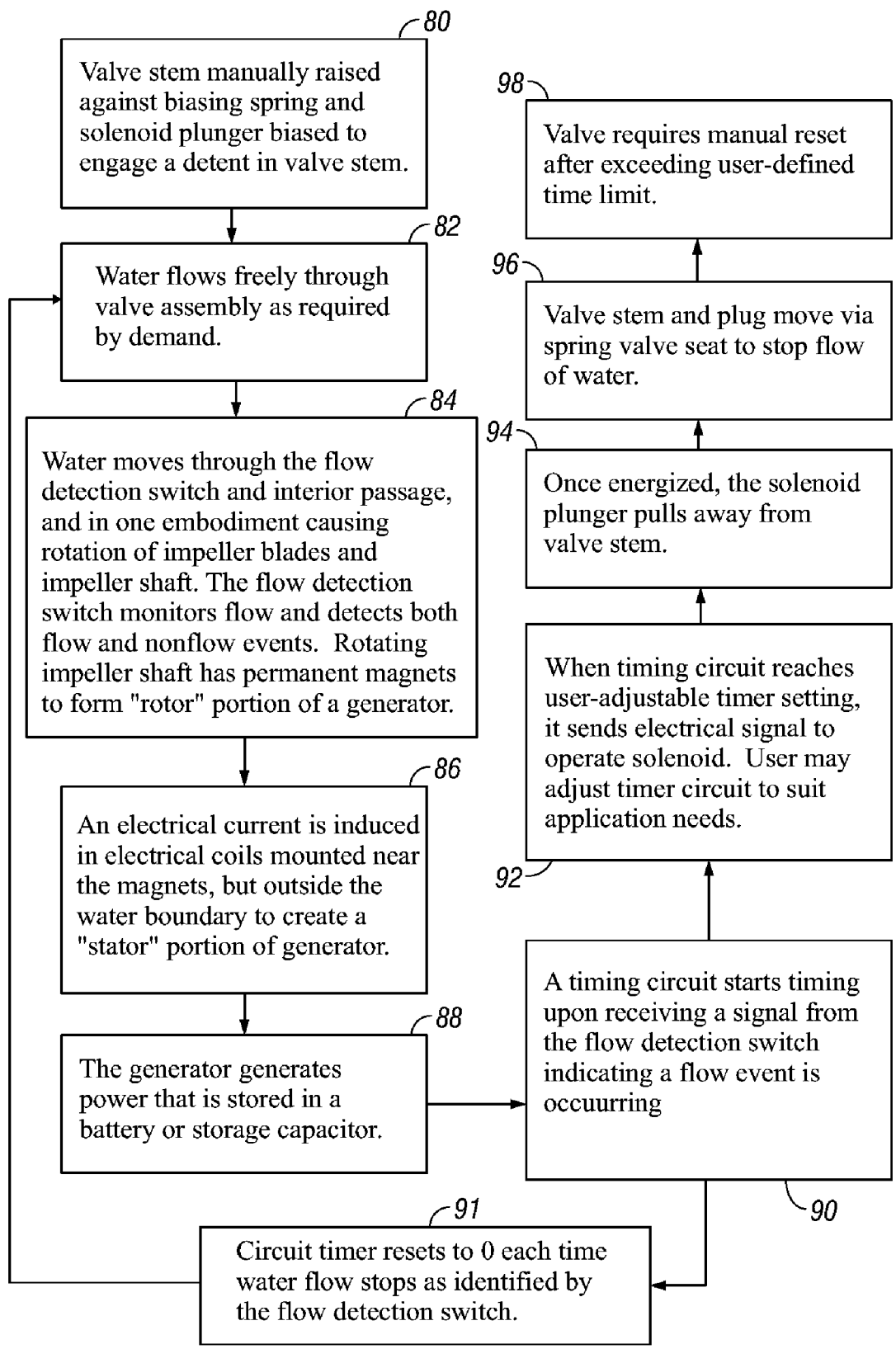
FIG. 2 is a flow chart showing steps of operation for the water safety shut-off valve of FIG. 1.

FIG. 2 shows a flow chart of the operation of the valve assembly 10 shown in FIG. 1. The valve assembly 10 is connected at the inlet 20 and outlet 28 to a standard plumbing system. As shown at 80, the valve stem 54 may be manually raised against the biasing spring 56 allowing the solenoid plunger 46 to engage the detent 52 in the valve stem 54. At 82, the water or other fluid flows freely through the valve assembly 10 as is required by demand of the appliance or other device connected at the outlet 28 of the valve assembly 10. At 84, water or other fluid moves through the flow detection switch 122 and the interior passage or pathway 18, and in one exemplary embodiment causing rotation of the impeller 26 and impeller shaft 32. Also, at 84, the flow detection switch 122 monitors flow and detects both flow and nonflow events. The rotating impeller shaft 32 rotates permanent magnets attached to the impeller shaft 32 to form a rotor portion of a generating system. In the embodiment where an impeller 26 is used, step 86 explains that an electrical current is induced in electrical coils 36 which are mounted near the magnets of the rotor 34, away from the water boundary from the valve assembly 10 to create a stator portion 36 of the electrical generator. As shown in 88, the generating system 34, 36 generates electricity by inducing an electrical current through the windings of the stator 36 by the changing poles of the permanent magnets of the rotor 34 and that electrical energy is stored in a battery or capacitor 40. At 90, once the timing circuit 42 receives a signal from the flow detection switch 122 indicating a flow event is occurring, i.e., detects electricity is being generated, indicating that water or fluid is flowing through the flow path 18, the timing circuit 42 begins timing a duration that the water or fluid is flowing through the flow path 18 and particularly the flow detection switch 122. Each time the water flow stops as identified by the flow detection switch 122, the circuit timer 42 is reset to a value of zero as shown at 91. If the water flow does not stop, 92 explains that when the timing circuit reaches a preset and user adjustable timer setting value, the timing circuit 42 initiates sending of an electrical signal to operate the solenoid 44. The valve assembly 10 is preferably set up so that a user may adjust the timer circuit 42 to suit the application in which the valve assembly 10 is used as shown in 92. Once the solenoid 44 is energized, the solenoid plunger 46 pulls away from the valve stem 54 and out of the detent 52 as given in 94. Step 96 gives that the valve stem 54 and attached valve plug 22 move once the solenoid plunger disengages the detent 54 using the biasing force supplied by the valve stem spring 56 to seat the valve plug 22 firmly against the valve seat 24 to stop the flow of water or fluid through the flow path 18 of the valve assembly 10. The final step, step 98, shown in FIG. 2, requires that the valve assembly 10 can be manually reset by pulling upward on the valve stem or trip indicator 54 after the timing circuit 42 reaches a value exceeding a preset user defined time limit.

It is understood, however, that many different steps or combination of steps adding or deleting from those shown in FIG. 2 can be used to control and operate the valve assembly 10.

Tests on a prototype of the valve assembly 10 shown in FIG. 1 indicate that there is a proportional relationship between volumetric flow rate and electricity generated, making a user adjustable time or predetermined duration possible through the flow detection switch 122 in the valve assembly 10. In addition, the valve assembly 10 can be configured so that the valve plug 22 will trip or close after a predetermined volume of fluid has passed through the flow path 18. Since the generated electricity is proportional to the flow rate, the electronics on the pc board 38 and the timing circuit 42 can calculate volume of liquid through the valve assembly 10 and close the flow path 18 after the predetermined volume has passed through the valve assembly 10. For example, the valve assembly 10 can be set to close after 500 gallons of water or fluid has passed through the valve assembly 10. The desired volume set point is adjustable for different volumes.

Figure 3:
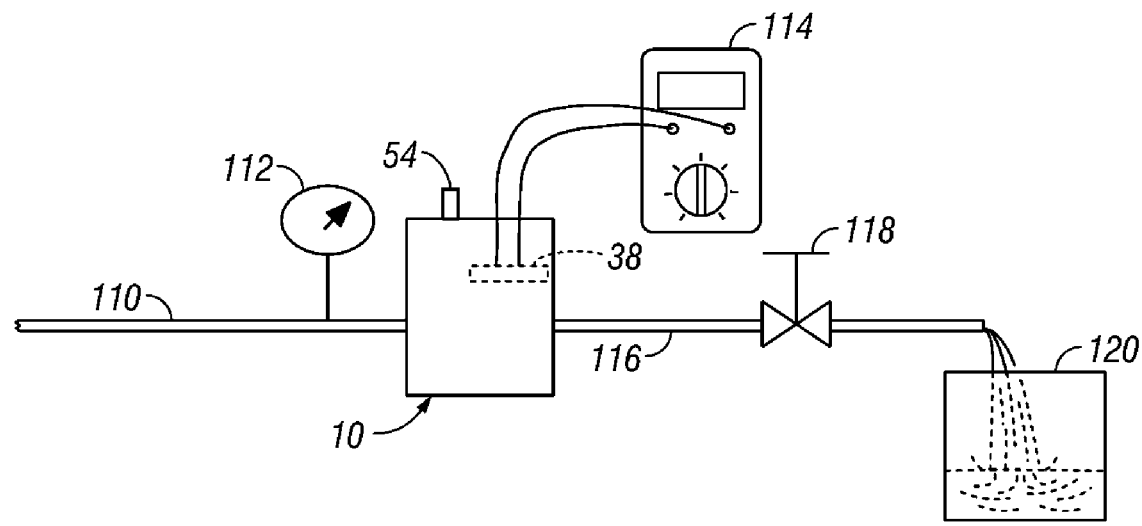
FIG. 3 shows a test setup for testing operation of the water conservation safety shut-off valve of FIG. 1.

The testing setup is shown in FIG. 3 for testing the valve assembly 10. The water pressure in a city water line 110 is tested using a fluid pressure gauge 112 at the inlet 20 of the valve assembly 10. A multimeter 114 was connected to the generated electrical outputs on the printed circuit board 38 for measuring generated voltage AC. An exit water line 116 was connected to the water outlet connection 28 of the valve assembly 10. A flow control valve 118 was used to regulate the flow of water through the valve assembly 10, downstream of the valve assembly 10. The water flowing through the test setup was then drained into a 1-gallon measuring container 20 for measuring and containment. The data collected for pressure at the fluid pressure gauge 112, the millivolt AC voltage at the printed circuit board 38, the time for filling the 1-gallon measuring container 20, and the calculated gallons per minute flow rate are given in Table 1.

TABLE 1

| | | Time to Collect 1 Gallon of Water Flow Rate | |
|---|---|---|---|
| P1 psig | mVac | Sec | Gal/min |
| 43 | 60 | 100 | 0.60 |
| 40 | 83 | 78 | 0.77 |
| 37 | 100 | 65 | 0.92 |
| 33 | 122 | 57 | 1.05 |
| 27 | 150 | 43 | 1.40 |
| 20 | 180 | 38 | 1.67 |
| 14 | 200 | 33 | 1.82 |
| 11 | 208 | 31 | 1.94 |

Figure 4:
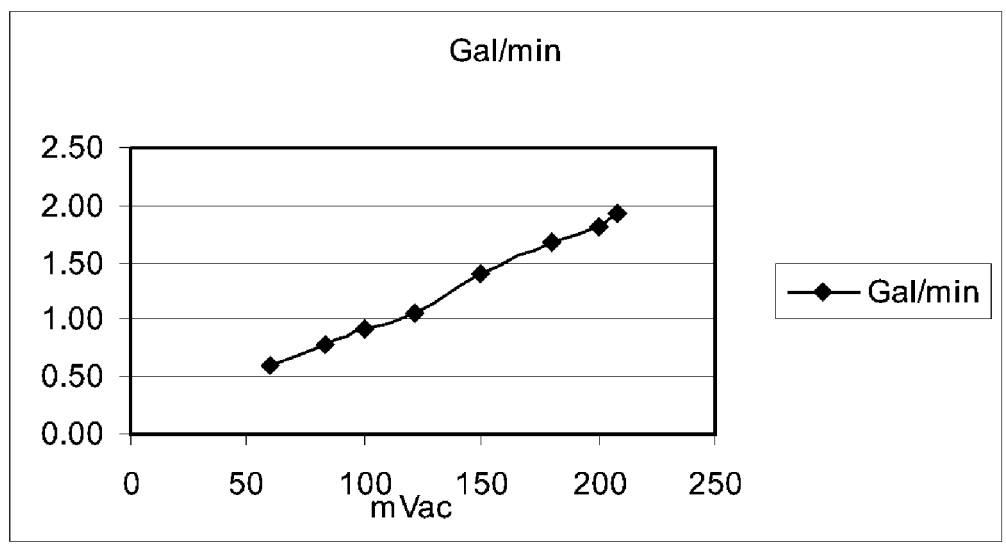
FIG. 4 shows a chart of volumetric flow rate through the water conservation safety shut-off valve of FIG. 1 versus voltage of electricity generated by the generator.

FIG. 4 then shows a chart of the data collected as shown in Table 1. The data in table 1 is not limiting on design of the present invention, but only one example to prove a proportional relationship between flow rate and generated electricity. Thus, the design capabilities of the present invention can be scaled according to design criteria and need for specific use applications.

The results shown in Table 1 and FIG. 4 indicate that the valve assembly 10 can be used to generate self-sustaining electricity using the water flow through the valve assembly 10 to generate power to operate the controls for the valve assembly 10. In addition, since flow rate is proportional with the generated electricity, in one embodiment, adjustments in flow rate may be used to vary generated voltage output of the generating system 34, 36 and to adjust predetermined time-out values.

Figure 5:
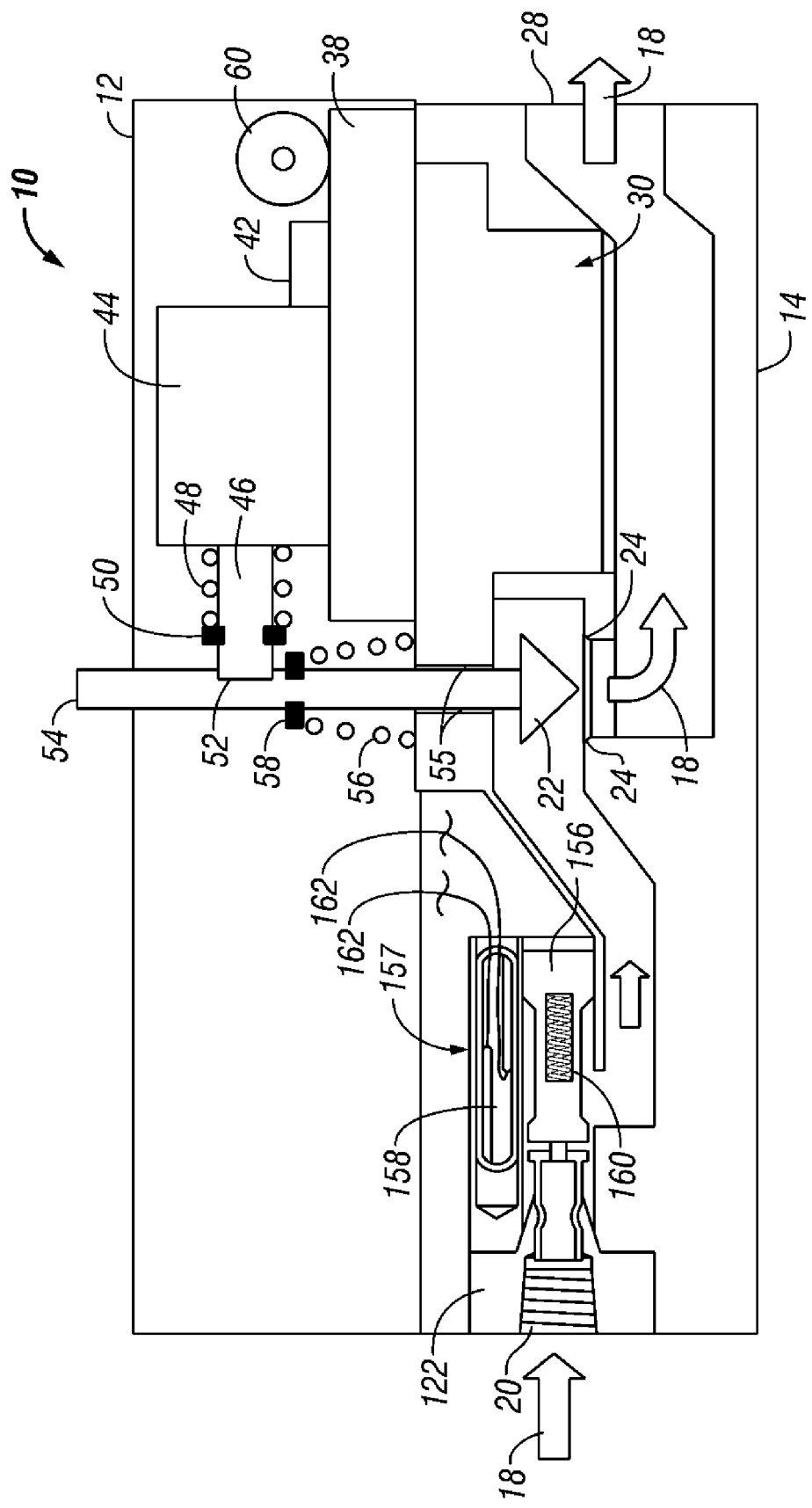
FIG. 5 shows a cutaway side view of another embodiment of a water conservation safety shut-off valve.
Figure 6:
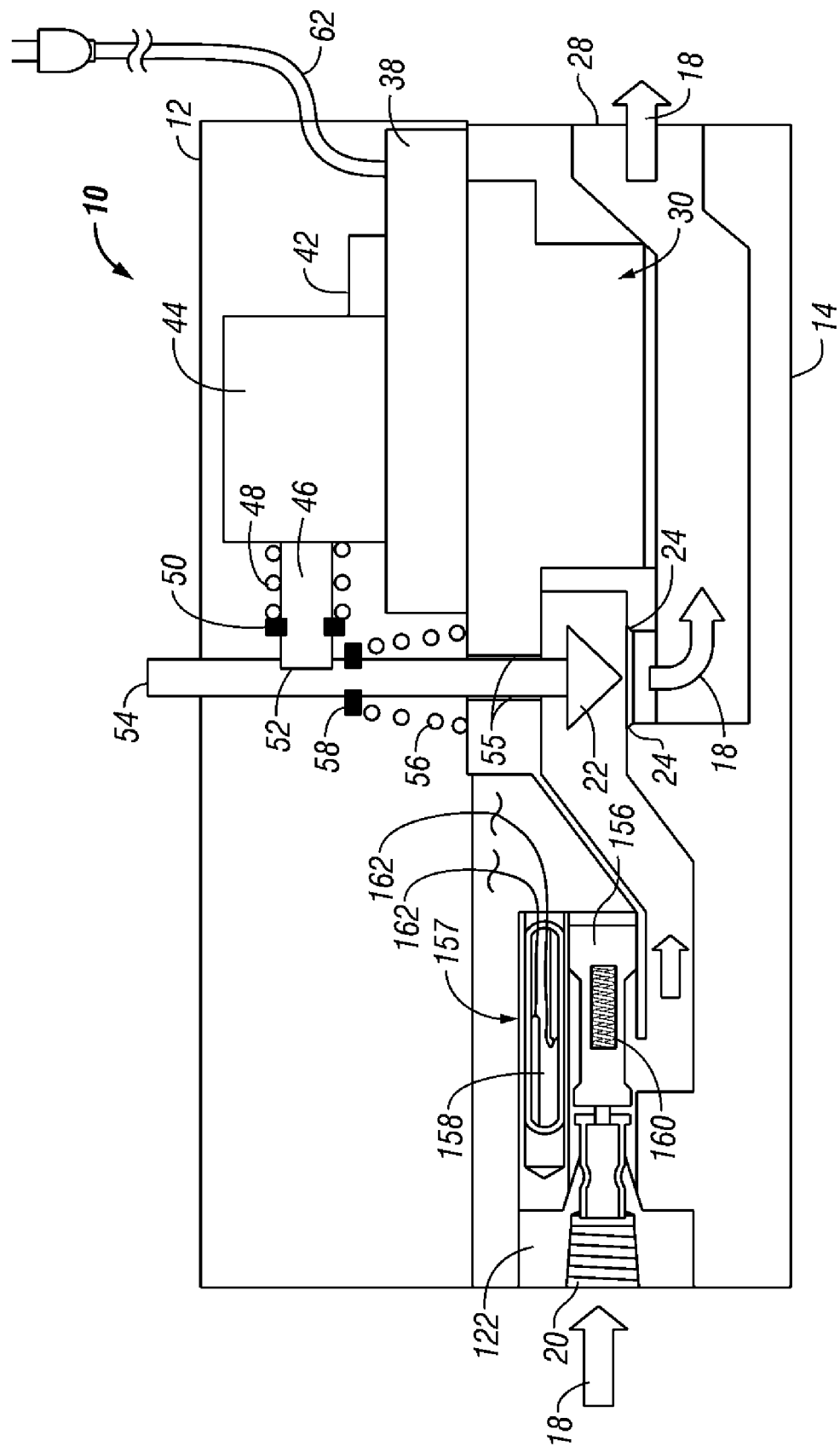
FIG. 6 shows a cutaway side view of still another embodiment of a water conservation safety shut-off valve.

Other embodiments of a water conservation safety shut-off valve assembly 10 are shown in FIGS. 5 and 6. These embodiments work essentially the same as described above for FIG. 1. However, FIG. 5 has a standard battery 60 electrically connected to the printer circuit board 38 for powering the electronics on the printed circuit board 38 and thus does away with the need for the impeller 26, unless in the case where battery 60 is rechargeable. Also, in this embodiment, the flow detection switch 122 detects flow through the flow path 18.

Another embodiment of the water conservation safety shut-off valve assembly 10 is shown in FIG. 6 having an electrical power cord 62 attached to the printed circuit board 38 for powering the electronics on board the printed circuit board 38 and operating the valve assembly 10. The valve assembly 10 shown in FIG. 6 operates similarly to the valve assembly 10 shown in FIGS. 1 and 5 above. In addition, the detection of water flowing through the flow path 18 in the embodiment shown in FIG. 6 is similar to that shown in FIG. 5 and described above.

Figure 7:
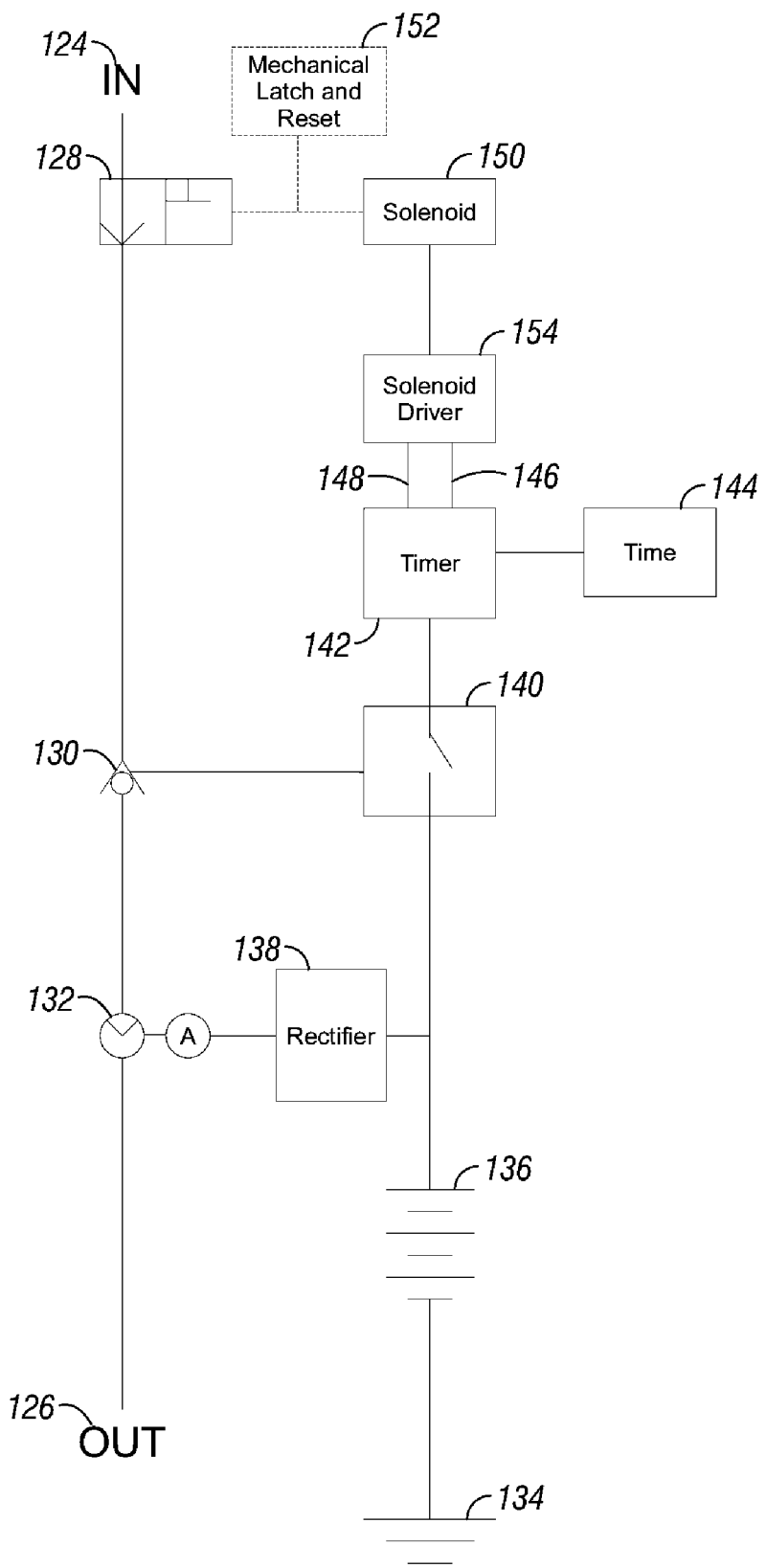
FIG. 7 shows a block diagram of one exemplary embodiment of the present invention.
Figure 8:
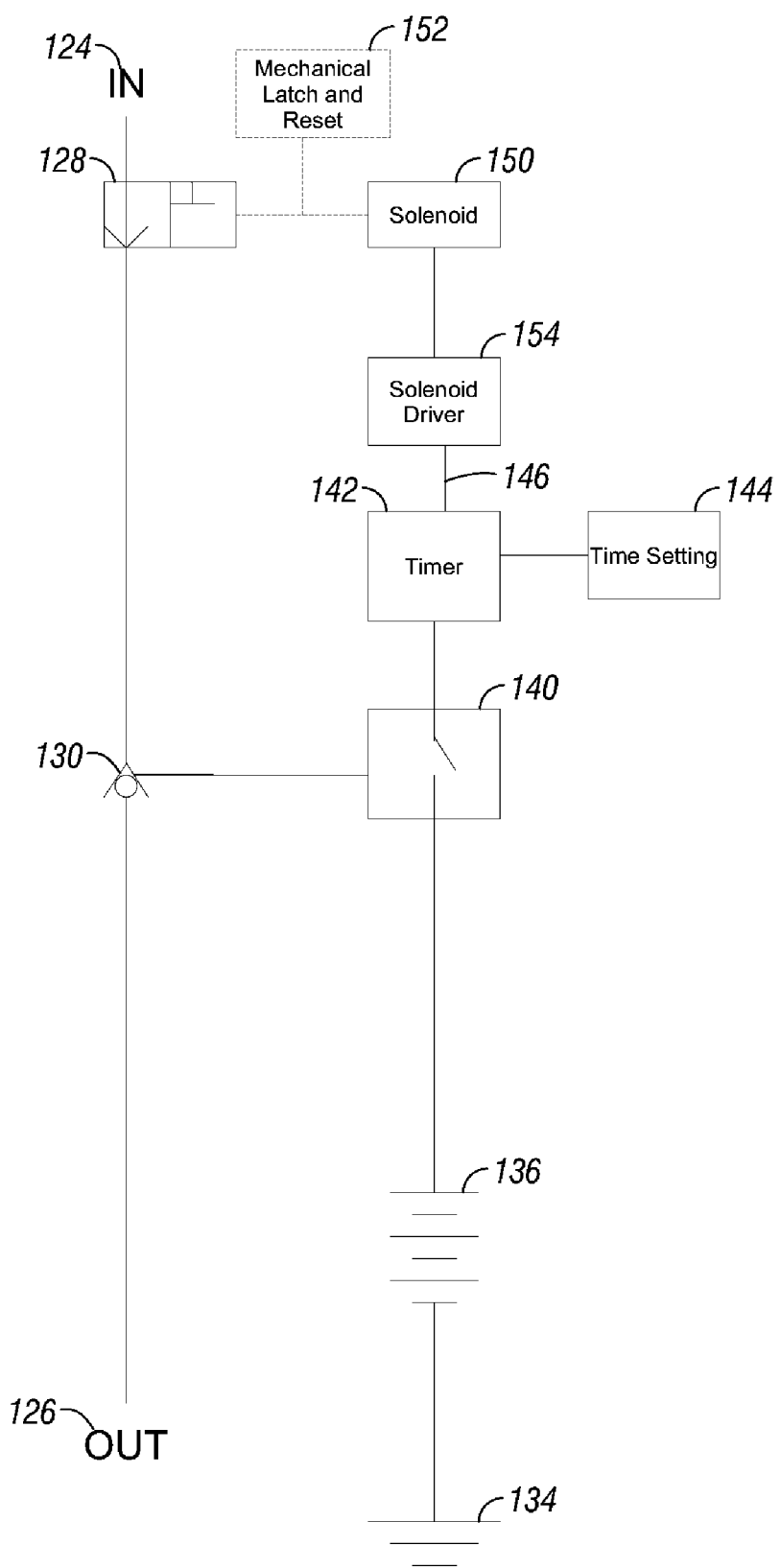
FIG. 8 shows a block diagram of another exemplary embodiment of the present invention.

FIGS. 7 and 8 show a block diagram for different embodiments of the present invention. Specifically, FIG. 7 shows an exemplary embodiment of the valve assembly 10 wherein the valve assembly is electrically self sustaining.

In FIG. 7, the valve assembly 10 is connected at inlet 124 and outlet 126 to a standard plumbing system. Water or other liquid passing through inlet 124 also passes through valve 128 and continues on through flow detection device 130 having a flow switch 140. Water or other liquid passing through the flow detection device 130 passes through generator 132 having a rectifier 138 and out of the valve assembly 10 through outlet 126. Electric current passing through rectifier 138 is used to charge power cell 136 which is grounded at 134. When water or other liquid is flowing through the valve assembly 10 and particularly flow detection device 130, flow switch 140 is closed sending electrical current to the timer 142 to begin timing the flow event. Timer 142 has a time setting device 144 which may be set to a specific indexed time or variable time as previously explained. Timer 142 is connected to solenoid driver 154 by both a trigger solenoid line 146 and charge line 148. If the timer 142 times out, a signal is sent to the solenoid driver 154 in which solenoid 150 is activated to release latch 152 is released to close off valve 128.

FIG. 8 shows another embodiment of the water conservation safety shut-off valve assembly 10. The embodiment shown in FIG. 8 operates similar to the embodiment shown in FIG. 7 which has been previously described. The embodiment shown in FIG. 8 operates using a depletable energy storage device or power cell such as a battery, capacitor, or the like. Power cell 136 is used to power the valve assembly 10. Because the flow switch 130 requires no power during non-flow events and very little power during flow events, the life of the power cell 136 should be able to prolong for many years of operation.

Figure 9:
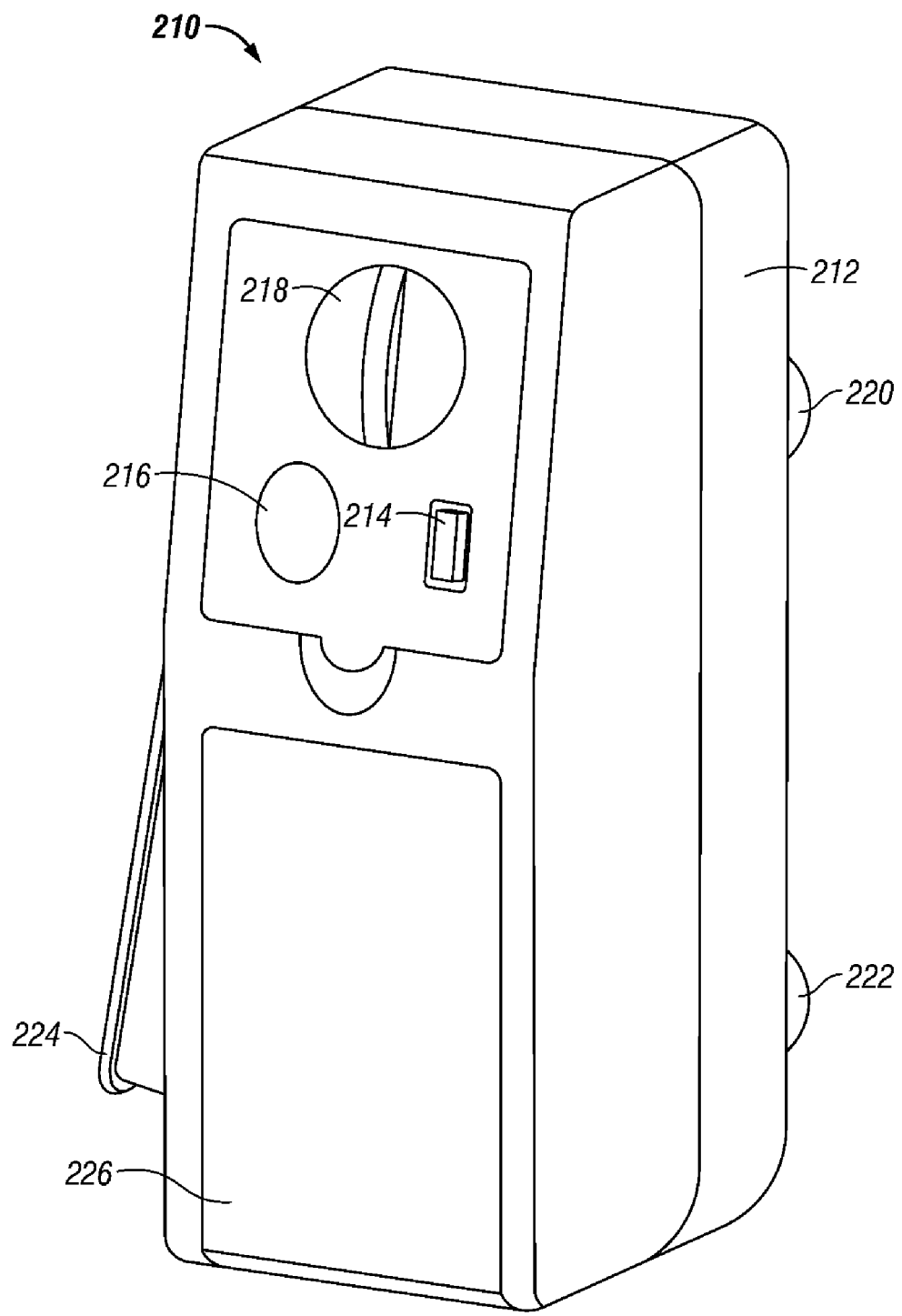
FIG. 9 is an isometric view of another embodiment of the water conservation safety shut-off valve of the present invention.
Figure 10:
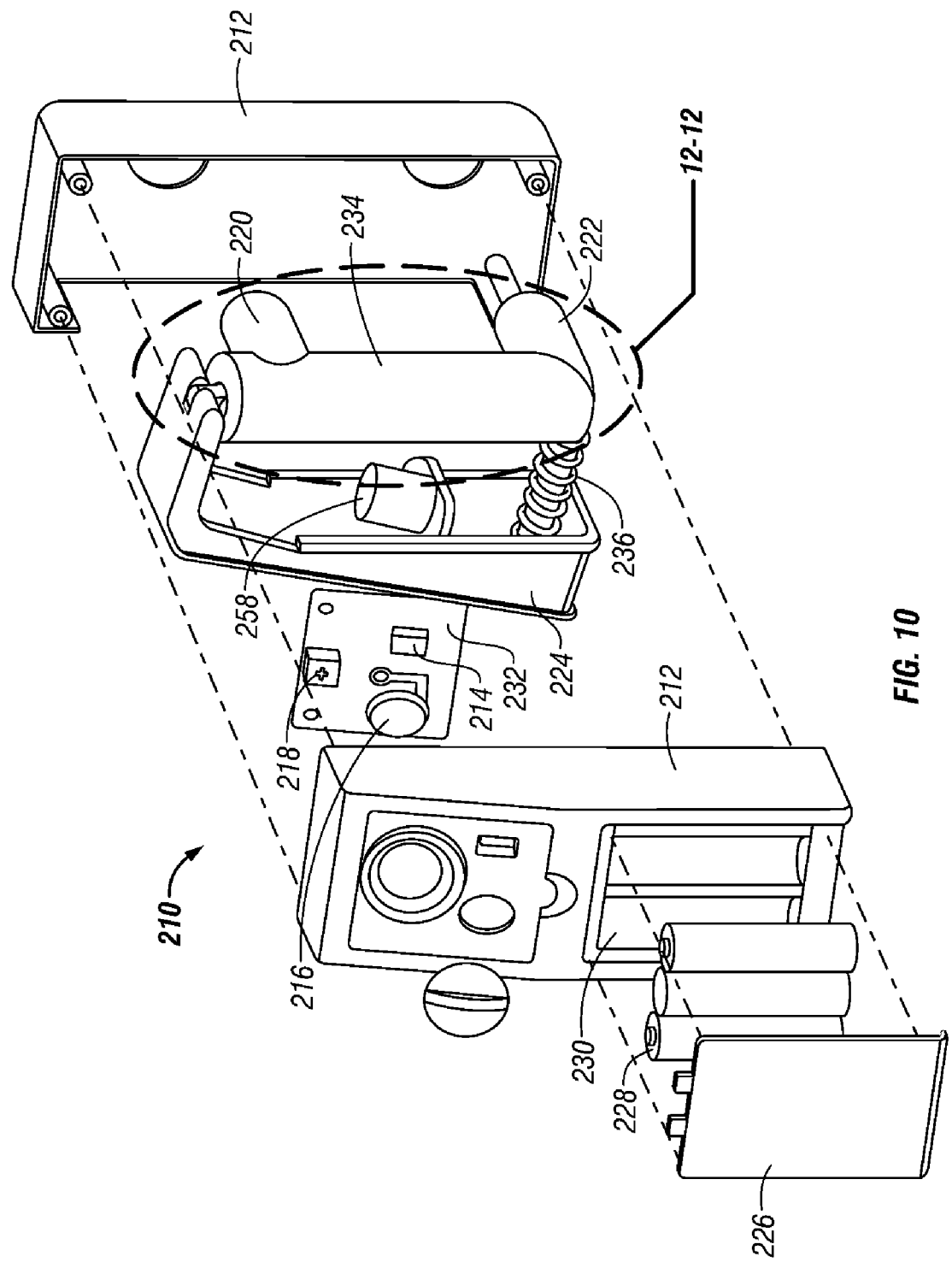
FIG. 10 is an exploded view of the water conservation safety shut-off valve shown in FIG. 1.
Figure 11:
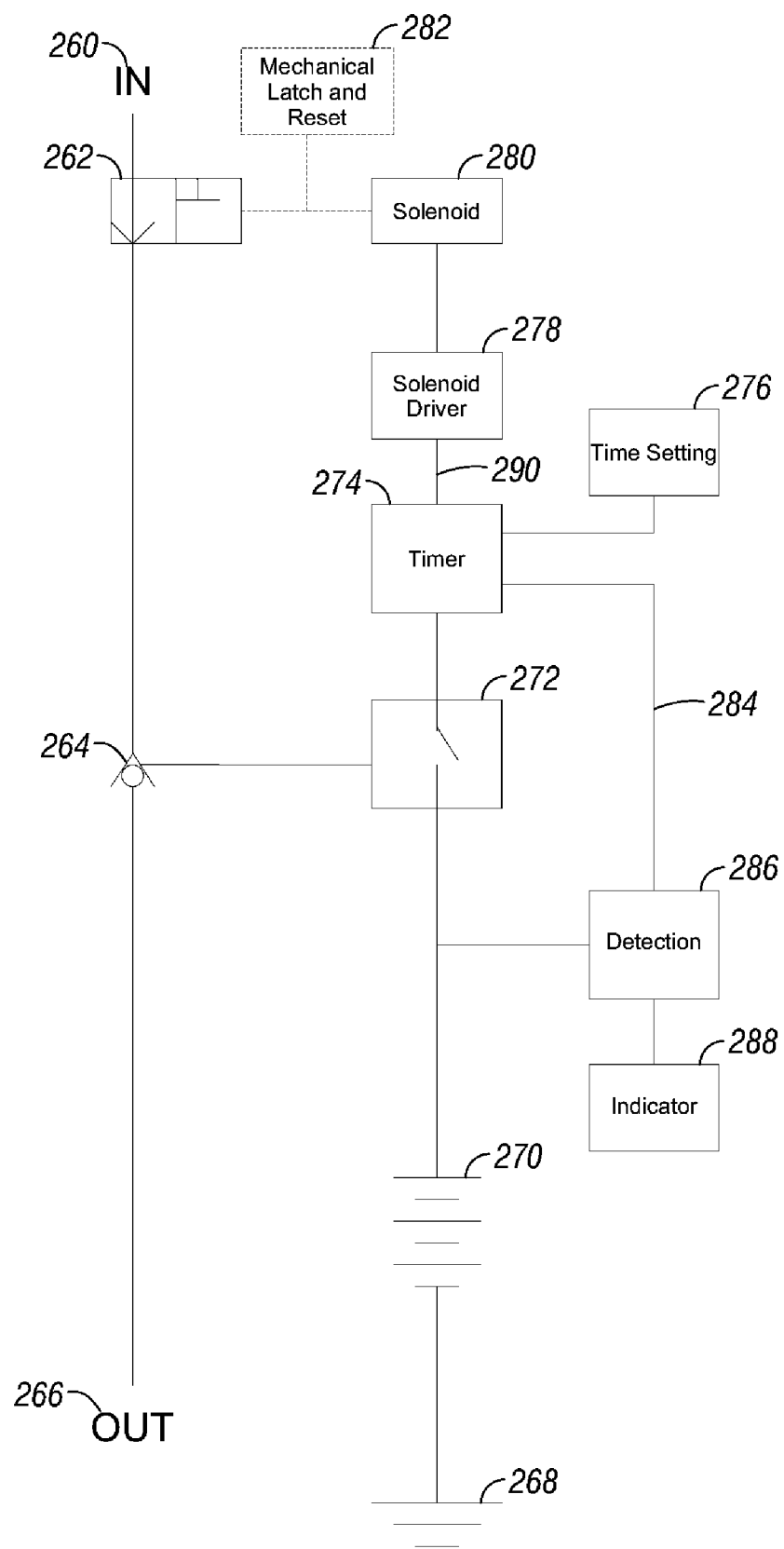
FIG. 11 shows a block diagram of the water conservation safety shut-off valve shown in FIG. 1 according to an exemplary embodiment of the present invention.

FIGS. 9-11 illustrate another embodiment of the water conservation safety shut-off valve assembly 210. Similar to the aforementioned embodiments, valve 210 has a cover 212 for protecting the internal workings of the valve assembly 210. Positioned on the cover 212 of the valve 210 is an indicator 214 adapted to alert or notify the user when the power source for operating the valve 210 has been depleted. In the case where a depletable power source, such as batteries is used to power the valve 210, the indicator 214 notifies the user or operator when the batteries need replaced. A test button 216 and timer 218 is also positioned on the cover 212 of the valve 210. The timer 218 is adapted to allow the user to select an approximate time setting at which the valve 210 terminates flow after detecting a flow event. For example, the timer 218 may use a minutes, hours scale to provide the user with a time selection for setting the valve 210. FIG. 9 also shows the inlet 220 and outlet 222 of the valve 210. A reset switch 224 is adapted to extend through the cover 212 of the valve 210.

Figure 12:
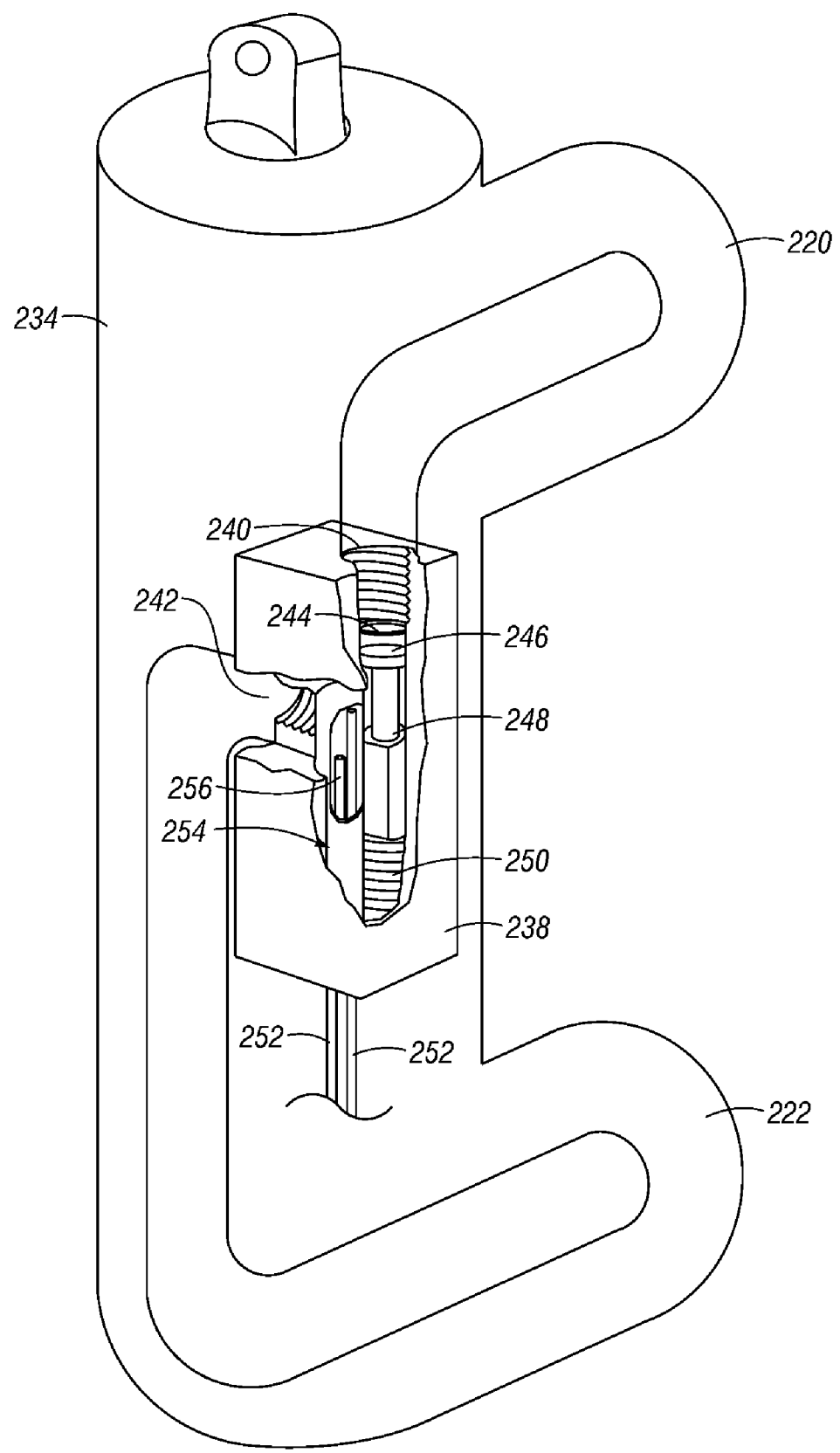
FIG. 12 is a sectional view taken along line 12-12 in FIG. 10.

FIG. 10 shows an exploded view of the valve 210. FIG. 10 shows the cover 212 of the valve 210 having a battery compartment 230 adapted to hold one or more batteries 228 using the cover plate 226. A circuit board 232 is positioned within the cover 212 of the valve 212 and is operable by controls egressing the cover 212 of the valve 210. The indicator 214, test button 216, and timer 218 are connected to the circuit board 232 which is powered by battery 228. A valve body 234 is also positioned within cover 212 of the valve 210. A spring 236 may be used to bias the reset switch 224 outward and away from the cover 212 of the valve 210. A solenoid 258 may also be housed within the cover 212 of the valve 210 for operating the valve body 234. The inlet 220 of the valve body 234 is in fluid connection with inlet 240 of the valve switch 238. Water flowing through the inlet 220 of the valve body 234 is communicated to the inlet 240 of the valve switch 238. As best illustrated in FIG. 12, the inlet 240 of the valve switch 238 has a valve seat 244. A piston 248 having a valve plug 246 is biased toward the valve seat 244 by a spring 250. The switch assembly 254 within the valve switch 238 has a switch 256. The switch 256 is adapted to detect movement of the piston 248. The switch assembly 254 operates similar to the aforementioned flow detection device 130. The valve switch 238 is further adapted to act as a valve whereby the valve plug 246 is pressed against the valve seat 244 to terminate water flow through the valve switch 238. The valve switch 238 has wires 252 to electrically connect to circuit board 232. Solenoid 258 may be used to actuate piston 248 by moving valve plug 246 of piston 248 into and out of valve seat 244. When the valve plug 246 is retracted from the valve seat 244, water is allowed to pass through the inlet 240 and out the outlet 242 of the valve switch 238. The reset switch 224 is adapted to mechanically move the valve plug 246 away from the valve seat 244 thereby opening the valve switch 238 for water flow and allowing the operator to mechanically reset the valve 210. In another aspect of the present invention, the circuit board 232 may include an indicator to notifying the user if the valve 210 is in an open or closed position. For example, in the event the valve switch 238 is triggered to the closed position whereby the valve plug 246 is released into the valve seat 244 and terminates flow through the valve switch 238, the operator may use the reset switch 224 to manually reset the valve switch 238 to an open position to allow water to pass through the valve switch 238. Additionally, the operator may be able to test the valve 210 by pressing the test button 216. In one aspect of the present invention, pressing the test button 216 may cause the valve plug 246 to seal against the valve seat 244 terminating water flow through the valve switch 238. The operator may use the reset switch 224 to reset the valve switch 238 or open the valve switch 238 to fluid flow. In another aspect of the present invention, the valve 210 may be equipped with a fail safe mode so that when the battery 228 has reached a low voltage threshold, the solenoid 258 is activated and closes the valve switch 238. The operator may then manually reset the valve 210 using reset switch 224.

As previously described, the valve switch 238 has a piston 248 and switch assembly 254 having a reed switch 256. The piston 248 includes a pheretic portion or magnet (not shown). The reed switch 256 is adapted to detect the position of the pheretic portion or magnet within the piston 248. The piston 248 may be configured to move when fluid flow through the valve switch 238 is greater than so many drips per second. For example, the piston 248 may be configured to move when fluid flow through the valve switch 238 is greater than one drip per second. Larger flow rates through the valve switch 238 may displace the piston 248 allowing for maximum flow and minimal pressure drop across the valve switch 238.

FIG. 11 shows a block diagram for one embodiment of the water conservation safety shut-off valve assembly 210. The valve 210 is connected at inlet 260 and outlet 266 to a standard plumbing system. Water or other liquid passing through inlet 260 also passes through valve 262 and continues on through flow detection device 264 having a valve switch 272. The valve switch 272 is connected to a power source 270 which is connected to ground 268. The valve switch is also electrically connected to timer 274. A power detection loop 284 is connected between the timer 274 and the ground 268. The power detection loop 284 has a detector 286 with an indicator 288. The detector 286 and the indicator 288 are adapted to notify the user when the power source 270 exceeds a low voltage threshold. The indicator 288 may be an LED or other light emitting member adapted to notify the user that the power source 270 needs replaced. When water or other liquid is flowing through the valve 210 and flow detection device 264, valve switch 272 is closed communicating electrical current to the timer 274 to begin timing the flow event. Timer 274 has a time setting device 276 which may be set to a specific index time or variable time as previously explained. Timer 274 is connected to solenoid driver 278 by a trigger solenoid line 290. If the timer 274 times out, a signal is communicated to the solenoid driver 278 in which solenoid 280 is activated. The activation of solenoid 280 causes valve plug 246 on piston 248 to engage valve seat 244 of valve switch 238 to terminate water flow through the valve switch 238. After the solenoid 280 is triggered, the operator may manually reset the valve 210 using mechanical latch reset 282 so valve 210. After the valve 210 is reset, the flow detection device 264 monitors the flow of fluid between inlet 260 and outlet 266.

In conclusion, the water conservation safety shut-off valve assembly 10 of the present invention is manually set to an open position and allows water or other fluids to run through the valve assembly 10 under normal use. When a preset time value or duration has timed out with water or fluid flowing through the valve continually, the valve closes indicating that there is a problem with the downstream usage of the water supply or that the desired time has simply elapsed. The valve assembly can generate its own electricity to run the electronics and the timer circuit or can have the electronics powered by a battery 60, 228 or through standard household power via a power cord 62.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. A fluid shut-off valve assembly comprising:
   a valve body having a fluid passageway;
   a valve plug adapted to close-off the fluid passageway;
   a flow detection switch having a flow sensor with a variable actuation set point, the flow sensor adapted to detect fluid flow through the fluid passageway;
   a timer electrically connected to the flow detection switch, the timer activated by the flow detection switch and adapted to time duration of fluid flowing through the fluid passageway;
   the timer further adapted to time out to cause the valve plug to close-off the fluid passageway to prevent fluid waste; and
   the flew sensor notifies the timer of a fluid flow event exceeding the actuation set point.

2. The fluid shut-off valve assembly of claim 1 wherein the flow sensor further comprises a piston displaced by fluid flow through the fluid passageway.

3. The fluid shut-off valve assembly of claim 2 wherein the flow sensor further comprises a reed switch adapted to be magnetically activated by the piston, the reed switch adapted to communicate electrically with the timer to notify the timer of a fluid flow event.

4. The fluid shut-off valve assembly of claim 3 wherein the piston within the flow sensor may be reset to a neutral position in a nonfluid flow event.

5. The fluid shut-off valve assembly of claim 1 further comprising an electrical generating system that generates electricity by rotating a rotor of a generator with fluid passing through the fluid passageway.

6. The fluid shut-off valve assembly of claim 1 further comprising an electrical storage device for storing generated electricity.

7. The fluid shut-off valve assembly of claim 1 wherein the valve plug has a catch released by an electrical solenoid.

8. The fluid shut-off valve assembly of claim 5 wherein the flow detection switch is powered by the electrical generating system.

9. A water shut-off valve assembly comprising:
   a valve body having a water passageway;
   a valve plug biased to close-off the water passageway;
   a flow detection device associated with the water passageway and having a magnetically actuated switch, wherein the switch is actuated upon detection of water flow;
   a timer electrically connected to the magnetically actuated switch, the timer activated by the flow detection device and adapted to time duration of water flow;
   the timer further adapted to time out and trigger the valve plug to stop water flow to prevent water waste; and
   the flow detection device signals the timer to reset when a nonwater flow event is detected.

10. The water shut-off valve assembly of claim 9 wherein the flow detection device further comprises a piston adapted to actuate the magnetically actuated switch upon being displaced by fluid flow through the water passage.

11. The water shut-off valve assembly of claim 9 wherein the magnetically actuated switch signals the timer when water flow through the flow detection device meets or exceeds a variable actuation set point for the flow detection device.

12. The water shut-off valve assembly of claim 9 wherein a solenoid actuated by the timer releases a plunger from a detent in the valve plug to release the valve plug.

13. A method of conserving fluids comprising the steps of:
   providing a shut-off valve, the valve including a valve body having a fluid flow path, a valve plug, a flow detection switch having a flow sensor, and a timer electrically connected to the flow detection switch;
   moving the valve plug out of the fluid flow path;
   sensing fluid flow through the fluid flow path using the flow sensor;
   activating the timer by sending a signal from the flow detection switch to the timer during a fluid flow event;
   setting an actuation set point for notifying the timer of the fluid flow event exceeding the actuation set point of the flow detection switch; and
   releasing the valve plug into the fluid flow path to obstruct fluid flow through the shut-off valve to prevent fluid waste upon the timer timing out.

14. The method of conserving fluids of claim 13 further comprising the step of displacing a piston in the flow detection switch.

15. The method of conserving fluids of claim 14 further comprising the step of actuating magnetically a reed switch by displacing the piston to notify electronically the timer of the fluid flow event.

16. The method of conserving fluids of claim 15 further comprising the step of sensing a nonfluid flow event with the piston for moving the reed switch to a deactivated position.

17. The method of conserving fluids of claim 13 further comprising the step of generating electricity with fluids passing through the shut-off valve for powering electronics within the shut-off valve.

18. The method of conserving fluids of claim 13 further comprising the step resetting the timer with the flow detection switch upon sensing the nonfluid flow event.

19. A method of reducing water loss through leaky appliances comprising the steps of:
- connecting an automated shut-off valve to a water supply line;
- monitoring water flow through the automated shut-off valve with a flow detection device having a magnetically actuated switch;
- switching the magnetically actuated switch by moving a piston with water passing through a fluid passageway of the shut-off valve;
- timing, duration of water flow exceeding an actuation set point of the flow detection device with a timer;
- moving a valve plug into the fluid passageway to obstruct water flow through the automated shut-off valve to prevent water waste upon the timer timing out; and
- resetting the timer upon the flow detection device detecting a nonflow event.

20. The method of claim 19 further comprising the step of maintaining water pressure through the fluid passageway by keeping the fluid passageway unobstructed during a water flow event.

21. The method of claim 19 further comprising the step of charging a depletable energy source by passing water by an impeller for electrically actuating a solenoid adapted to release the valve plug into the fluid passageway.

* * * * *

UNITED STATES PATENT AND TRADEMARK OFFICE
CERTIFICATE OF CORRECTION

PATENT NO.        : 7,779,852 B2                              Page 1 of 1
APPLICATION NO.   : 11/871300
DATED             : August 24, 2010
INVENTOR(S)       : Roger A. Burlage et al.

It is certified that error appears in the above-identified patent and that said Letters Patent is hereby corrected as shown below:

Title Page item (57), Line 10,
DELETE: "value"
ADD: --valve--

Col. 13, Claim 18, Line 9,
ADD after step --of--

Col. 14, Claim 19, Line 4,
DELETE after timing ","

Signed and Sealed this

Thirtieth Day of November, 2010

David J. Kappos
*Director of the United States Patent and Trademark Office*